United States Patent
Patterson

(10) Patent No.: US 9,328,778 B1
(45) Date of Patent: May 3, 2016

(54) PNEUMATIC LOCK-UP CLUTCH

(71) Applicant: Todd Patterson, Bunbury (AU)

(72) Inventor: Todd Patterson, Bunbury (AU)

(\*) Notice: Subject to any disclaimer, the term of this patent is extended or adjusted under 35 U.S.C. 154(b) by 11 days.

(21) Appl. No.: 14/299,380

(22) Filed: Jun. 9, 2014

Related U.S. Application Data

(63) Continuation-in-part of application No. 13/349,021, filed on Jan. 12, 2012, now Pat. No. 8,746,429.

(51) Int. Cl.
| | |
|---|---|
| *F16D 13/54* | (2006.01) |
| *F16D 13/70* | (2006.01) |
| *F16D 25/12* | (2006.01) |
| *F16D 48/06* | (2006.01) |
| *F16D 25/0638* | (2006.01) |
| *F16D 13/68* | (2006.01) |
| *F16D 25/08* | (2006.01) |
| *F16D 13/64* | (2006.01) |

(52) U.S. Cl.
CPC ............ *F16D 25/0638* (2013.01); *F16D 13/54* (2013.01); *F16D 25/12* (2013.01); *F16D 13/648* (2013.01); *F16D 13/683* (2013.01); *F16D 25/083* (2013.01); *F16D 2500/1028* (2013.01); *F16D 2500/1117* (2013.01)

(58) Field of Classification Search
None
See application file for complete search history.

(56) References Cited

U.S. PATENT DOCUMENTS

| | | | | |
|---|---|---|---|---|
| 2,593,521 | A * | 4/1952 | Ball | 192/56.31 |
| 3,753,478 | A * | 8/1973 | Shiber | 192/85.34 |
| 4,427,102 | A * | 1/1984 | Schilling | 192/85.23 |
| 4,986,403 | A * | 1/1991 | Tipton | 192/70.11 |
| 6,272,725 | B1 * | 8/2001 | Stout, Jr. | 29/402.06 |
| 7,287,632 | B1 * | 10/2007 | Taylor | 192/70.17 |
| 8,746,429 | B1 * | 6/2014 | Patterson | 192/85.24 |
| 2012/0228077 | A1 * | 9/2012 | DeGowske | 192/70.11 |
| 2013/0168198 | A1 * | 7/2013 | Youngwerth et al. | 192/107 M |

\* cited by examiner

*Primary Examiner* — Colby M Hansen
(74) *Attorney, Agent, or Firm* — QuickPatents, LLC; Kevin Prince

(57) ABSTRACT

The present device is an improved clutch system that conveys rotational energy from a power source to the gearbox input shaft of a motorcycle. A clutch basket is mechanically coupled to the power source and slidably engaged to pronged clutch drive plates, which are frictionally engaged to splined steel driven plates. Pressurized air moves a piston against a pressure plate, causing the clutch hub and splined steel driven plates to engage. The rotating splined steel driven plates will then rotate the clutch hub to convey rotational energy to the gearbox input shaft of the motorcycle.

14 Claims, 2 Drawing Sheets

PNEUMATIC LOCK-UP CLUTCH

CROSS-REFERENCE TO RELATED APPLICATIONS

This application claims the benefit of U.S. Provisional patent application Ser. No. 13/349,021, filed on Jan. 12, 2012, now U.S. Pat. No. 8,746,4529 granted on Jun. 10, 2014, and incorporated herein by reference.

STATEMENT REGARDING FEDERALLY SPONSORED RESEARCH AND DEVELOPMENT

Not Applicable.

FIELD OF THE INVENTION

This invention relates to clutches, and more particularly to an improved motorcycle clutch.

DISCUSSION OF RELATED ART

A transmission is a mechanical device that transmits energy from one source to another. In a motorcycle, the transmission will transfer rotational energy from the engine to the drive shaft and, ultimately, to the drive wheels. By shifting several gears of different sizes, the transmission can reduce the rotational speed of the engine to a speed more suitable for the drive wheels. An automatic transmission will perform these shifts automatically, while a manual transmission requires the user to shift the gears.

A clutch is a device in a manual transmission that physically connects one rotating member to another. Typically, the engine will rotate a clutch basket and the clutch pressure plate will physically engage all of the steel and friction plates, through the use of springs to press the plates together. In a motorcycle, a wet clutch is typically used, where the clutch system is immersed in oil to reduce wear, however dry clutch systems are used also. Several clutch drive plates can be used to increase the overall friction.

U.S. Pat. No. 5,360,381 to Swist on Nov. 1, 1994, describes a device for automatically controlling the position of a clutch between a power source and a gearbox input shaft by regulating pressure to a clutch engagement member. The system will calculate throttle position, RPM, engine load, clutch drive plate pressure, and other variables to calculate the optimal pressure to apply to the clutch drive plates. While the device uses pneumatic pressure, the clutch drive plates engage with unidirectional pressure, the engagement pressure is at the center of the clutch drive plates, the clutch isn't adapted to be used with a traditional manual transmission, and load from the clutch cover and pressure plate actuator is used to engage the clutch drive plates.

U.S. Pat. No. 4,427,102 to Schilling on Jan. 24, 1984, describes fluid engaged and spring returned fan clutch for connecting a power source to a power receiver. A piston is used to create fluid pressure for engaging the power source and power receiver, while springs are used to disengage them. While the device utilizes a piston to apply pressure to the system, fluid pressure is used to engage the plates, springs are utilized to resist the fluid pressure, and multiple clutch drive plates are not utilized.

U.S. Pat. No. 4,986,403 to Tipton on Jan. 22, 1991, describes a motorcycle slider clutch where a pressure plate engages several discs by a pneumatic cylinder and piston which moves the plates from a first position to a second position. The clutch drive plates are disengaged with the pneumatic piston, while a solenoid is used to release pressure and engage the clutch drive plates for a fast launch. While the device offers a transmission for quick engagement and launch, springs are still used to apply pressure, the clutch drive plates engage with unidirectional pressure, the engagement pressure is at the center of the clutch drive plates, and the pneumatic pressure is applied to disengage the clutch drive plates as opposed to engaging them.

In my previous application, now granted as U.S. Pat. No. 8,746,429, I included a pneumatic piston between a backing plate and a pressure plate that applied pressure to a stack of clutch plates and splined plates to transfer power between the motorcycle engine and the gearbox input shaft of the motorcycle transmission. I found that if the cylinder cap is mechanically fastened directly to a front wall of the clutch basket, providing a streamlined, compact design with fewer parts, even more clutch basket rigidity.

Therefore, there is a need for a device that eliminates traditional coil/diaphragm springs by utilizing a pneumatic cylinder and piston to engage and disengage multiple clutch drive plates, where the pressure can be varied to provide different amounts of slip and drive as desired. Such a needed device would reduce stress applied to the clutch basket and shafts of a traditional clutch assembly, and would not be prone to variable clutch slip based on clutch plate wear. Such a needed invention would further allow for reduced clutch pressure to be utilized when higher pressures are not required, prolonging clutch plate life. Further, such a needed system would eliminate wear or frictional power loss between rotating pistons and clutch pressure plates of the prior art. Furthermore, such a needed device would be relatively simple and economical to manufacture, requiring relatively fewer parts than conventional clutch systems, and could be manually actuated in the event of pneumatic component failures with a similar tactile feedback to the user. The present invention accomplishes these objectives.

SUMMARY OF THE INVENTION

The present device is an improved clutch system that conveys rotational energy from a power source to a gearbox input shaft of a motorcycle. The present invention comprises a clutch basket having a plurality of longitudinally-parallel slots formed in an outer wall. These slots are slidably engaged with pronged clutch drive plates, which are in turn frictionally engaged with splined steel driven plates. A clutch hub is adapted for slidable engagement with the splines of the splined steel driven plates, the clutch hub further engaged to the gearbox input shaft of the motorcycle. A pneumatic piston that is housed in the pneumatic cylinder cap, which is mechanically fastened directly to a front wall of the clutch basket. The piston capable of moving the pressure plate with air pressure to compress the stack of clutch plates and splined plates together.

The clutch basket is mechanically coupled to the power source. As such, when the power source is activated, it spins the clutch basket and pronged clutch drive plates. When air is introduced into the pneumatic cylinder, the piston presses against the pressure plate to press the splined steel driven plates against the pronged clutch drive plates and the backing plate, causing the splined steel driven plates to rotate. The rotating splined steel driven plates then rotate the clutch hub to convey rotational energy to the gearbox input shaft of the motorcycle.

The present eliminates traditional coil/diaphragm springs by utilizing a pneumatic cylinder and piston to engage and disengage multiple clutch drive plates, where the pressure can be varied to provide different amounts of slip and drive as desired. The present device reduces stress applied to the clutch basket and shafts of a traditional clutch assembly, and is not be prone to variable clutch slip based on clutch plate wear due to variable spring travel distances. The present invention further allows for reduced clutch pressure to be utilized when higher pressures are not required, prolonging clutch plate life, and eliminates wear or frictional power loss between rotating pistons and clutch pressure plates of the prior art. Furthermore, the present device is relatively simple and economical to manufacture, requiring relatively fewer parts than conventional clutch systems. It can be manually actuated in the event of pneumatic or computer component failures with a similar tactile feedback to the user via a hydraulic clutch lever/slave cylinder. Manual disengagement can be retained for normal clutch control and feel. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1A:
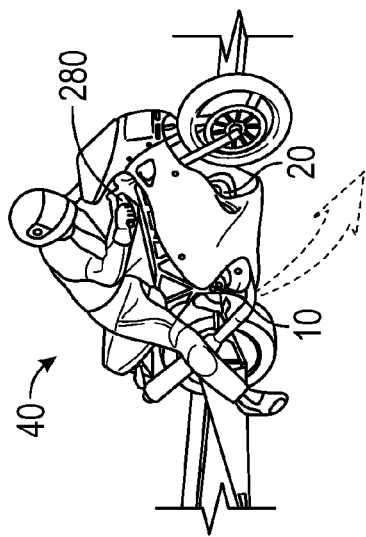
FIG. 1A is a perspective view of a motorcycle with an engine power source having the clutch improvement of the present invention.
Figure 1B:
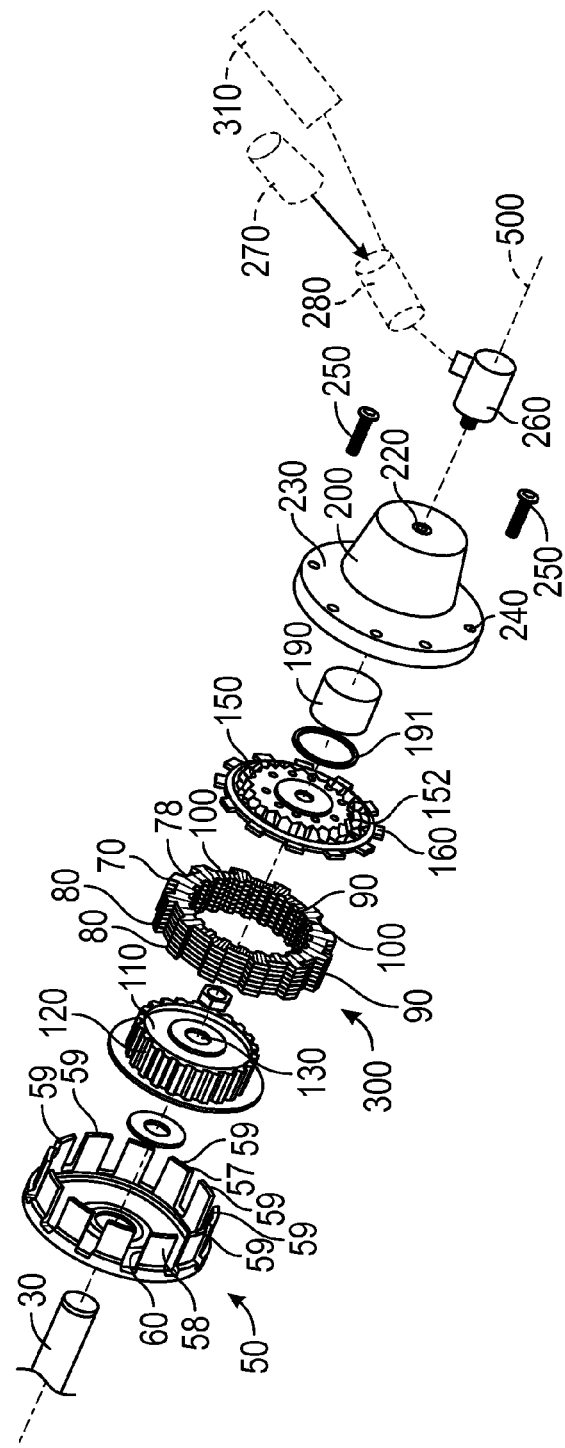
FIG. 1B is an exploded front perspective view of the invention.
Figure 2:
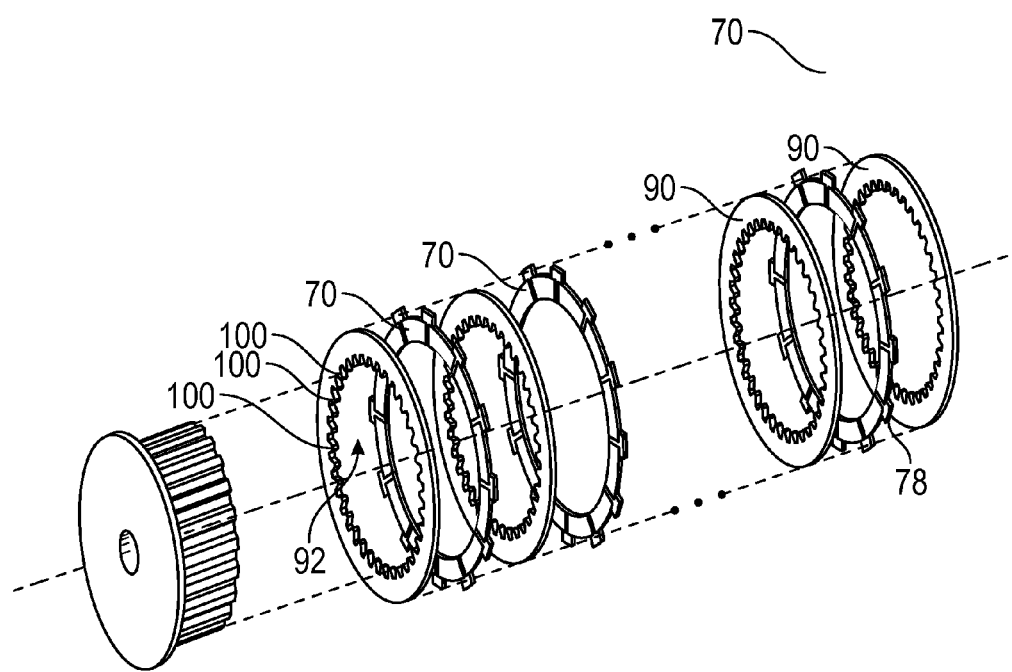
FIG. 2 is an exploded rear perspective view of the invention, illustrating the clutch drive plates and clutch hub in greater detail.

FIGS. 1A and 1B illustrate an improvement for a clutch system 10 that conveys rotational energy from a power source 20 to a gearbox input shaft 30 of a motorcycle 40. The clutch system 10 of the present invention comprises a clutch basket 50 having a plurality of longitudinally-parallel slots 60 formed in an outer wall 58 thereof. The clutch basket 50 further includes a plurality of threaded bolt apertures 59 on a forward side 57 thereof between each slot 60. The clutch basket 50 is mechanically coupled to the power source 20.

A plurality of annular, pronged clutch drive plates 70 are retained within the clutch basket 50, each having a plurality of prongs 80 projecting radially away from an outer peripheral edge 78, each prong 80 adapted for slidable engagement within one of the slots 60 of the clutch basket 50 such that the pronged clutch drive plates 70 are rotationally coupled to the clutch basket 50 and slidably moveable along a common longitudinal axis 500 thereof.

A plurality of annular, splined steel driven plates 90 are sandwiched between each of the pronged clutch drive plates 70 and include a plurality of splines 100 projecting inwardly from an inner edge 92 thereof. A clutch hub 110 having peripheral teeth 120 is adapted for slidable engagement with the splines 100 of each splined steel driven plate 90. The clutch hub 110 is rotationally coupled with each of the splined steel driven plates 90 mutually together. The splined steel driven plates 90 are preferably made from a rigid steel, steel alloy, or other suitably rigid and durable material. The clutch hub 110 comprises a central splined aperture 130 therein for engaging the gearbox input shaft 30 of the motorcycle 40.

A pressure plate 150 is adapted to slidably engage the clutch basket 50. The pressure plate 150 having a plurality of prongs 80 projecting radially away from an 78, each prong 80 adapted for slidable engagement within one of the slots 60 of the clutch basket 50 and slidably moveable along a common longitudinal axis 500 thereof.

A pneumatic piston 190 sealed with an O-ring 191 or other suitable seal is sandwiched between a pneumatic cylinder cap 230, having a pneumatic cylinder 200 therein. The cylinder cap 230 provides an air aperture 220 for introducing pressurized air into the pneumatic cylinder 200 of the cylinder cap 230 for driving the piston 190 against the pressure plate 150. A plurality of bolt apertures 240 traverses the cylinder cap 230. The pneumatic cylinder cap 230, piston 190, pressure plate 150, clutch hub 110, and clutch drive plates 70, 90 are all mutually fixed by a plurality of threaded bolts 250 traversing the cylinder cap apertures 240 and threaded bolt apertures 59 of the clutch basket 50.

When operational, the power source 20 spins the clutch basket 50 and pronged clutch drive plates 70. When pressurized air is introduced into the pneumatic cylinder 200, the piston 190 presses against the pressure plate 150 to press the splined steel driven plates 90 against the pronged clutch drive plates 70 and the cylinder cap 230, causing the splined steel driven plates 90 to rotate. The rotating splined steel driven plates 90 will then rotate the clutch hub 110 to convey rotational energy to the gearbox input shaft 30 of the motorcycle 40.

In one embodiment, a pneumatic rotational coupling 260 is used for introducing pressurized air from a pressurized air source 270 into the pneumatic cylinder cap 230. The pneumatic cylinder cap 230 is rotatable with respect to the pneumatic rotational coupling 260 and the air source 270. In a further alternative embodiment, pressurized air is introduced into the pneumatic cylinder 200 through a pneumatic rotational coupling 260, and air pressure is controlled by a proportional pressure valve 280. This valve 280 controls the pressure applied to the piston 190 and then a clutch plate pack 300. Supply air comes from the pressurized air source 270 being set at a stable pressure. The proportional pressure valve 280 is optionally electronically controlled by an onboard computer 310 (FIG. 1B).

In an alternative embodiment, the plurality of pronged clutch drive plates 70 is at least six. The clutch drive plates 70, 90 can be made from any material which will promote friction between plates and reduce wear. Materials include steel, carbon, fiber, ceramic, asbestos, steel and fibers mixtures, or any other suitable materials.

While a particular form of the invention has been illustrated and described, it will be apparent that various modifications can be made without departing from the spirit and scope of the invention. For example, gear, teeth, spline, and clutch sizes and shapes may vary while still performing the same essential functions. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An improvement for a clutch system that conveys rotational energy from a power source to a gearbox input shaft of a motorcycle, the clutch system of the type having a clutch basket having a plurality of longitudinally-parallel slots formed in an outer wall thereof and having a plurality of threaded bolt apertures on a first side thereof between each slot, the clutch basket mechanically coupled to the power source; a plurality of annular, pronged clutch drive plates each having a plurality of prongs projecting radially away from an outer peripheral edge, each prong adapted for slidable engagement within one of the slots of the clutch basket such that the pronged clutch drive plates are rotationally coupled to the clutch basket and slidably moveable along a common longitudinal axis thereof; a plurality of annular, splined steel driven plates sandwiching each of the pronged clutch drive plates and including a plurality of splines projecting inwardly from an inner edge thereof; a clutch hub having peripheral teeth adapted for slidable engagement with the splines of each splined steel driven plate, the clutch hub rotationally coupling each of the splined steel driven plates mutually together, the clutch hub including a central splined aperture therein for engaging the gearbox input shaft of the motorcycle; and a plurality of bolts that traverse apertures of a cylinder cap and engage the threaded apertures of the clutch basket; the improvement comprising:
   a pressure plate having a plurality of prongs projecting radially outwards from an outer edge thereof that are each adapted to slidably engage one of the slots of the clutch basket therewith;
   a pneumatic piston sandwiched between the pressure plate and the cylinder cap, the cylinder cap having a pneumatic cylinder therein and an air aperture therethrough for introducing pressurized air into the pneumatic cylinder for driving the piston against the pressure plate;
   the cylinder cap, piston, pressure plate, clutch hub, and clutch drive plates all mutually fixed by a plurality of threaded bolts that traverse the apertures of cylinder cap and engage the threaded apertures of the clutch basket;
   whereby with the power source spinning the clutch basket and pronged clutch drive plates, when air is introduced into the pneumatic cylinder the piston presses against the pressure plate to press the splined steel driven plates against the pronged clutch drive plates to cause the splined steel driven plates to rotate therewith, rotating the clutch hub to convey rotational energy to the gearbox input shaft of the motorcycle.

2. The clutch system of claim 1 further including a pneumatic rotational coupling for introducing pressurized air from a pressurized air source into the cylinder cap, the cylinder cap rotatable with respect to the pneumatic rotational coupling and the air source.

3. The clutch system of claim 2 wherein the pressurized air is introduced into the pneumatic cylinder through a clutch valve, and wherein the pressure of the pressurized air source is selectively adjustable.

4. The clutch system of claim 2 wherein at least one of the clutch drive plates is made from a metallic material.

5. The clutch system of claim 2 wherein at least one of the clutch drive plates is made from a metallic and fiber material.

6. The clutch system of claim 1 wherein the plurality of pronged clutch drive plates is at least six.

7. The clutch system of claim 1 wherein the plurality of threaded bolts is at least four.

8. A clutch system for conveying rotational energy from a power source to a gearbox input shaft of a motorcycle, comprising:
   a clutch basket having a plurality of longitudinally-parallel slots formed in an outer wall thereof, the clutch basket having a plurality of threaded bolt apertures on a first side thereof between each slot, the clutch basket mechanically coupled to the power source;
   a plurality of annular, pronged clutch drive plates each having a plurality of prongs projecting radially away from an outer peripheral edge thereof, each prong adapted for slidable engagement within one of the slots of the clutch basket such that the pronged clutch drive plates are rotationally coupled to the clutch basket and slidably moveable along a common longitudinal axis thereof;

a plurality of annular, splined steel driven plates sandwiching each of the pronged clutch drive plates and including a plurality of splines projecting inwardly from an inner edge thereof;

a clutch hub having peripheral teeth adapted for slidable engagement with the splines of each splined steel driven plate, the clutch hub rotationally coupling each of the splined steel driven plates mutually together, the clutch hub including a central splined aperture therein for engaging the gearbox input shaft of the motorcycle;

a pressure plate having a plurality of prongs projecting radially outwards from an outer edge thereof that are each adapted to slidably engage one of the slots of the clutch basket therewith;

a pneumatic piston sandwiched between the pressure plate and a cylinder cap, the cylinder cap having a pneumatic cylinder therein, a plurality of bolt apertures proximate a circumferential edge thereof, and an air aperture therethrough for introducing pressurized air into the pneumatic cylinder for driving the piston against the pressure plate;

the cylinder cap, piston, pressure plate, clutch hub, and clutch drive plates all mutually fixed by a plurality of bolts that traverse the apertures of cylinder cap and engaging the threaded apertures of the clutch basket;

whereby with the power source spinning the clutch basket and pronged clutch drive plates, when air is introduced into the pneumatic cylinder the piston presses against the pressure plate to press the splined steel driven plates against the pronged clutch drive plates to cause the splined steel driven plates to rotate therewith, rotating the clutch hub to convey rotational energy to the gearbox input shaft of the motorcycle.

9. The clutch system of claim 8 further including a pneumatic rotational coupling for introducing pressurized air from a pressurized air source into the cylinder cap, the cylinder cap rotatable with respect to the pneumatic rotational coupling and the air source.

10. The clutch system of claim 9 wherein the pressurized air is introduced into the pneumatic cylinder through a clutch valve, and wherein the pressure of the pressurized air source is selectively adjustable.

11. The clutch system of claim 9 wherein at least one of the clutch drive plates is made from a metallic material.

12. The clutch system of claim 9 wherein at least one of the clutch drive plates is made from a metallic and fiber material.

13. The clutch system of claim 8 wherein the plurality of pronged clutch drive plates is at least six.

14. The clutch system of claim 8 wherein the plurality of threaded bolts is at least four.

* * * * *